United States Patent [19]
Marren et al.

[11] Patent Number: 5,950,527
[45] Date of Patent: *Sep. 14, 1999

[54] COOKING APPARATUS

[75] Inventors: Charles Lyle Marren, Edifico Fabriola, la/4 Calle Bartholome, Bajo "A" CA', Catala, Palma de Mallorca, Spain; William Clifton McDonald, Jr., Midland, Tex.

[73] Assignees: Charles Lyle Marren; Murray W. Daniel, both of Alberta, Canada

[*] Notice: This patent is subject to a terminal disclaimer.

[21] Appl. No.: 07/855,886

[22] Filed: Mar. 23, 1992

[51] Int. Cl.⁶ ........................................ A47J 37/00
[52] U.S. Cl. .................. 99/481; 126/20; 126/51; 126/248
[58] Field of Search ............... 126/20, 248, 79, 126/51; 99/481, 474

[56] References Cited

U.S. PATENT DOCUMENTS

| | | |
|---|---|---|
| 1,304,728 | 5/1919 | Baron .................................. 126/248 X |
| 1,414,859 | 5/1922 | Bullot ...................................... 99/481 |
| 2,833,201 | 5/1958 | Simank ..................................... 99/481 |
| 3,301,172 | 1/1967 | Haro . |
| 3,667,449 | 6/1972 | Persinger et al. .................. 125/25 R X |
| 4,430,559 | 2/1984 | Rabay .............................. 126/25 R X |
| 4,469,084 | 9/1984 | Gillotti ............................... 126/248 X |
| 4,694,816 | 9/1987 | Fabbro ................................. 126/51 X |

FOREIGN PATENT DOCUMENTS

| | | |
|---|---|---|
| 140932 | 6/1912 | Canada . |
| 1072762 | 3/1980 | Canada . |

Primary Examiner—Carl D. Price

[57] ABSTRACT

A portable barbecue-type cooking apparatus for use in combination with a gas operated cook stove includes a housing defining a cooking chamber, the housing being defined by a bottom wall, side walls, end walls and a cover for closing the cooking chamber. Chimneys extend upwardly from the bottom wall of the housing whereby water can be placed in the heating chamber around the chimneys. A fan is rotatably mounted on each of the chimneys, so that when the housing is placed over the fans to rotate for deflecting grease and other food produced liquids away from the chimneys and into the water.

7 Claims, 4 Drawing Sheets

COOKING APPARATUS

BACKGROUND OF THE INVENTION

This invention relates to a cooking apparatus, and in particular to a portable barbecue apparatus for use with a gas operated cooking stove or other heat source apparatuses.

There has long been a need for a device for cooking fat containing foods (usually meat) over a heat source without burning the meat, and without grease from the meat dripping onto the heat source. Examples of the devices which offer solutions to the above described problem, or which otherwise have features in common with the present invention are found in Canadian Patent No. 140,932, which issued to J. Kowalski et al on Jun. 1, 1912 and 1,072,762, which issued to B. Boswell et al on Mar. 4, 1980, and U.S. Pat. Nos. 3,301,172, which issued to F. A. Haro on Jan. 31, 1967 and 4,694,816, issued to M. Fabbro on Sep. 22, 1987.

Many such devices only partially solve the problem of grease and other juices from the meat reaching the source of heat. The principle solution to the problem is indirect cooking, i.e. ensuring that the food being cooked is not disposed directly over the heat source, so that liquid dropping from the food does not drop onto the heat source. Obviously, such a solution necessitates a specially designed, large volume cooker. Moreover, the devices used to solve the problem are not always particularly efficient.

SUMMARY OF THE INVENTION

An object of the present invention is to provide an alternate solution to the above problem in the form of a relatively simple portable cooking apparatus for use with a gas operated cook stove. Another object of the invention is to provide such an apparatus in which the entire cooking area can be utilized.

Accordingly, the invention relates to a cooking apparatus comprising housing means defining a cooking chamber, said housing means include side wall means, bottom wall means and cover means for closing said cooking chamber; chimney means extending upwardly from said bottom wall means for admitting heat from a source thereof to the cooking chamber, whereby water can be placed in said housing means around said chimney means; and fan means for rotatable mounting on said chimney means, whereby, when the housing means is placed over a source of heat, rising heat causes said fan means to rotate for deflecting grease and other food produced liquids away from the chimney means and into the water.

BRIEF DESCRIPTION OF THE DRAWINGS

The invention will be described in greater detail with reference to the accompanying drawings, which illustrate a preferred embodiment of the invention, and wherein.

DESCRIPTION OF THE PREFERRED EMBODIMENTS

Figure 1:
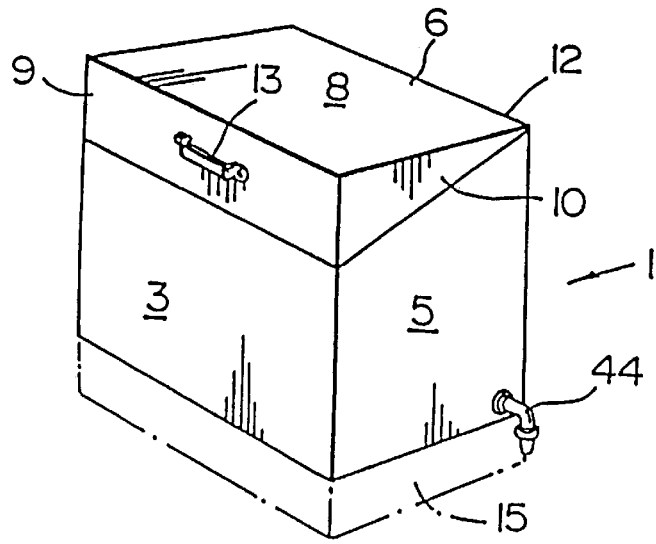
FIG. 1 is a schematic, isometric view of a cooking apparatus in accordance with the invention from one end and the front thereof.
Figure 2:
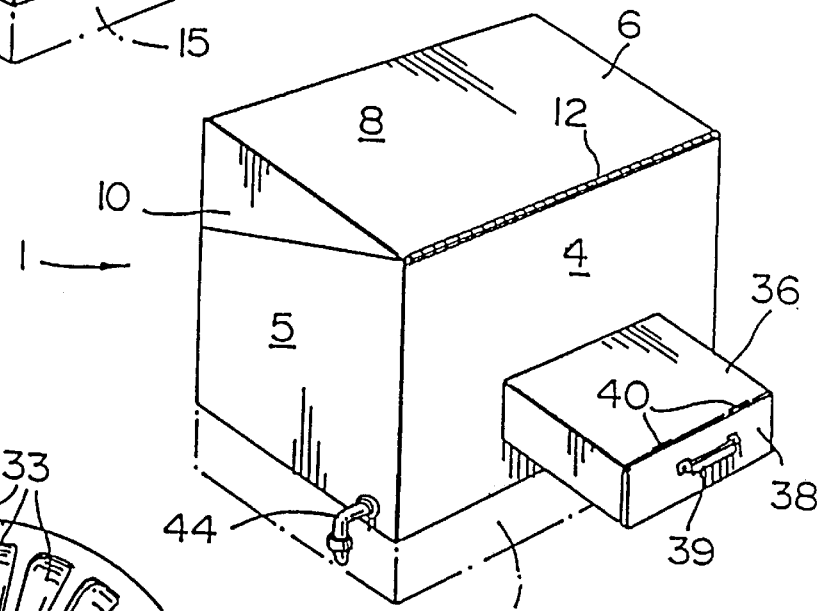
FIG. 2 is a schematic, isometric view of the apparatus of FIG. 1 from the same end and the rear thereof.
Figure 6:
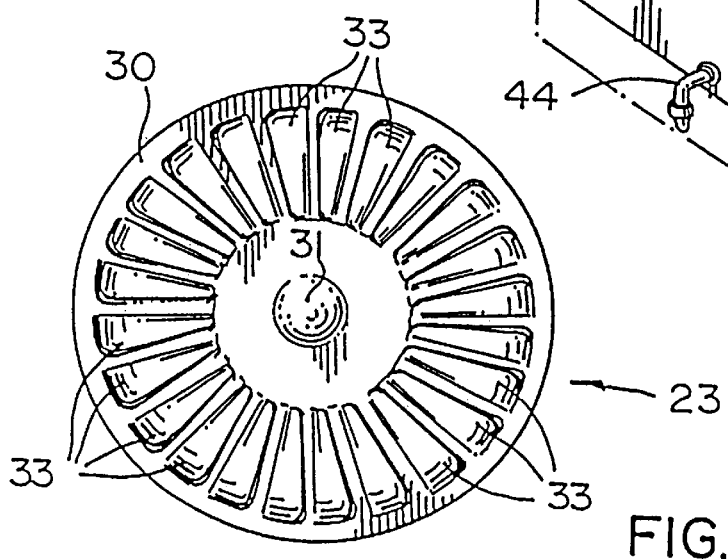
FIG. 6, which appears on the first sheet of drawings, is a plan view of a fan used in the apparatus of FIGS. 1 to 5.

With reference to the drawings, the apparatus of the present invention includes a rectangular housing generally indicated at 1. The housing 1 is defined by a bottom wall 2, front and rear end walls 3 and 4, side walls 5 and a cover 6. The cover 6 includes a rectangular top wall 8, a rectangular front wall 9 and triangular end walls 10, is connected to the top of the rear wall 4 by a piano hinge 12. A handle 13 is provided on the front wall 9 of the cover 6. The cover 6 includes a rectangular top wall 8, a rectangular front wall 9 and triangular end walls 10, is connected to the top of the rear wall 4 by a piano hinge 12. A handle 13 is provided on the front wall 9 of the cover 6. The apparatus is intended for use on a conventional gas operated camping stove 15 (e.g. a Coleman Stove) which includes two burners 16. Coleman is a registered trademark.

Figure 3:
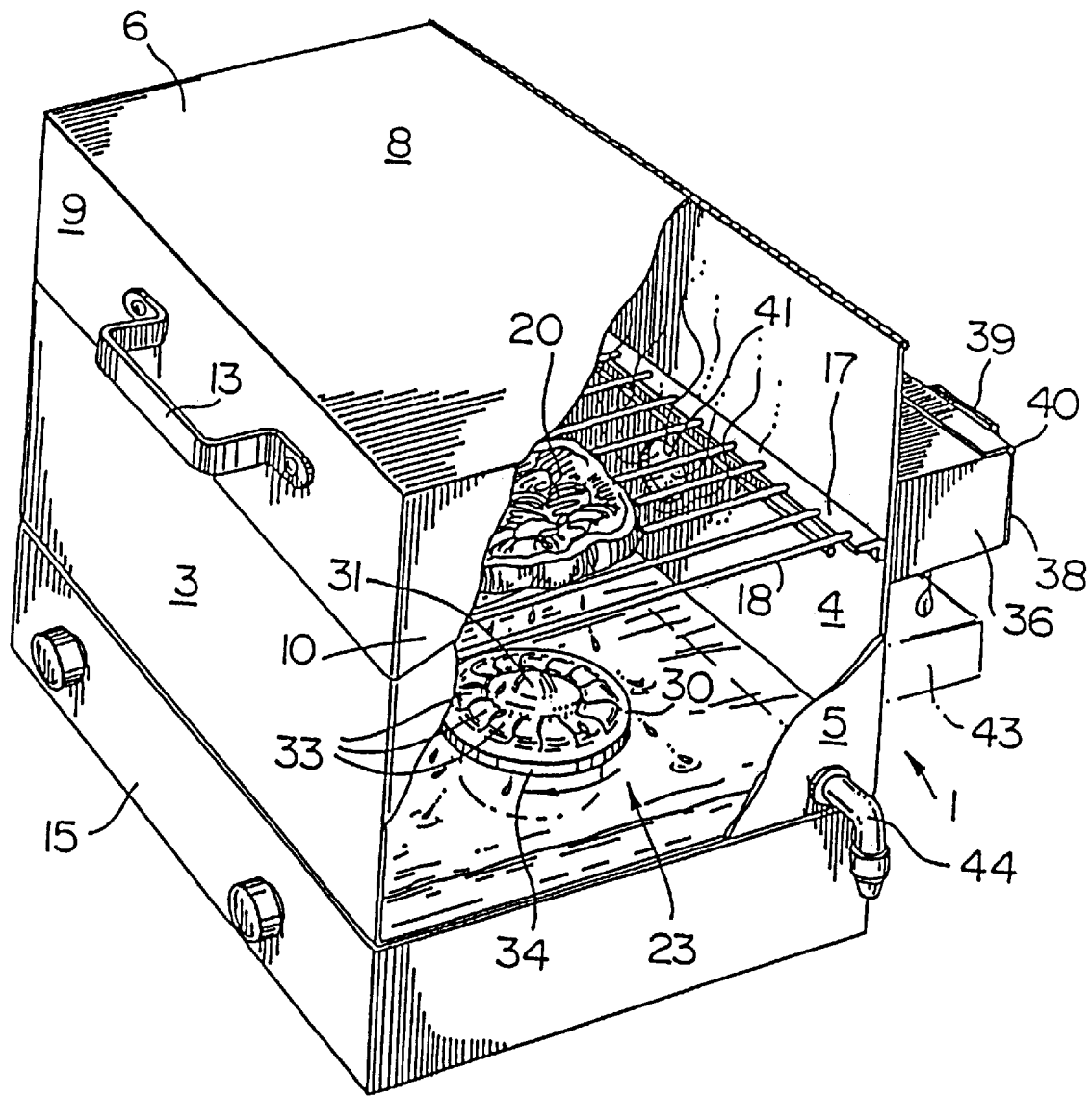
FIG. 3 is a schematic, partly sectioned, isometric view of the cooking apparatus of FIGS. 1 and 2.
Figure 4:
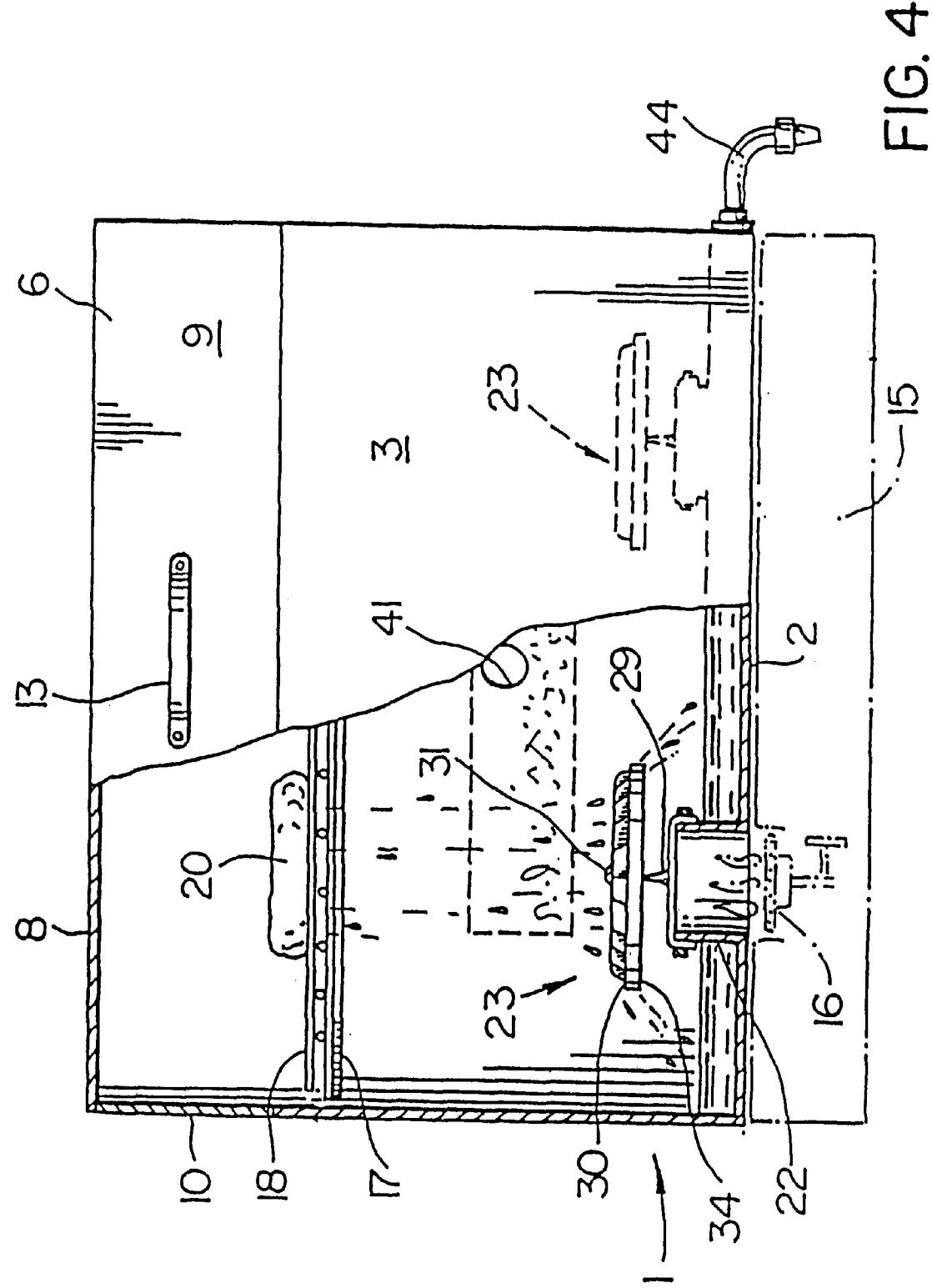
FIG. 4 is a partly sectioned front view of the apparatus of FIGS. 1 and 2.

A ledge 17 (FIGS. 3 to 5), is provided along the interior of each of the front and rear walls 3 and 4, respectively for supporting a conventional wire grill 18. The grill 18 supports food 20 during cooking. Heat reaches the food 20 via a pair of openings defined by sleeves 22 in the bottom wall 2 of the housing 1. The sleeves 22 are located over the burners 16 of the stove 15.

A fan generally indicated at 23 is rotatably mounted on each sleeve 22. For such purpose a generally inverted U-shaped crossbar 25 is mounted on the sleeve 22. Loops 26 on the sides of the sleeve 22 receive the legs 27 of the crossbar 25. A spindle 29 defined by a spike extends upwardly from the center of the crossbar 25 for rotatably supporting the fan 23 above the sleeve 22. The fan 23 is a thin metal disco 30 with a domed central hub 31 for receiving the spindle 29. A plurality of inclined louvres 33 extend radially outwardly from the hub 31. Heat rising from the burners 16 causes the fan 23 to rotate rapidly on the spindle 29. An annular flange 34 extends downwardly from the periphery of the disc 30.

Figure 5:
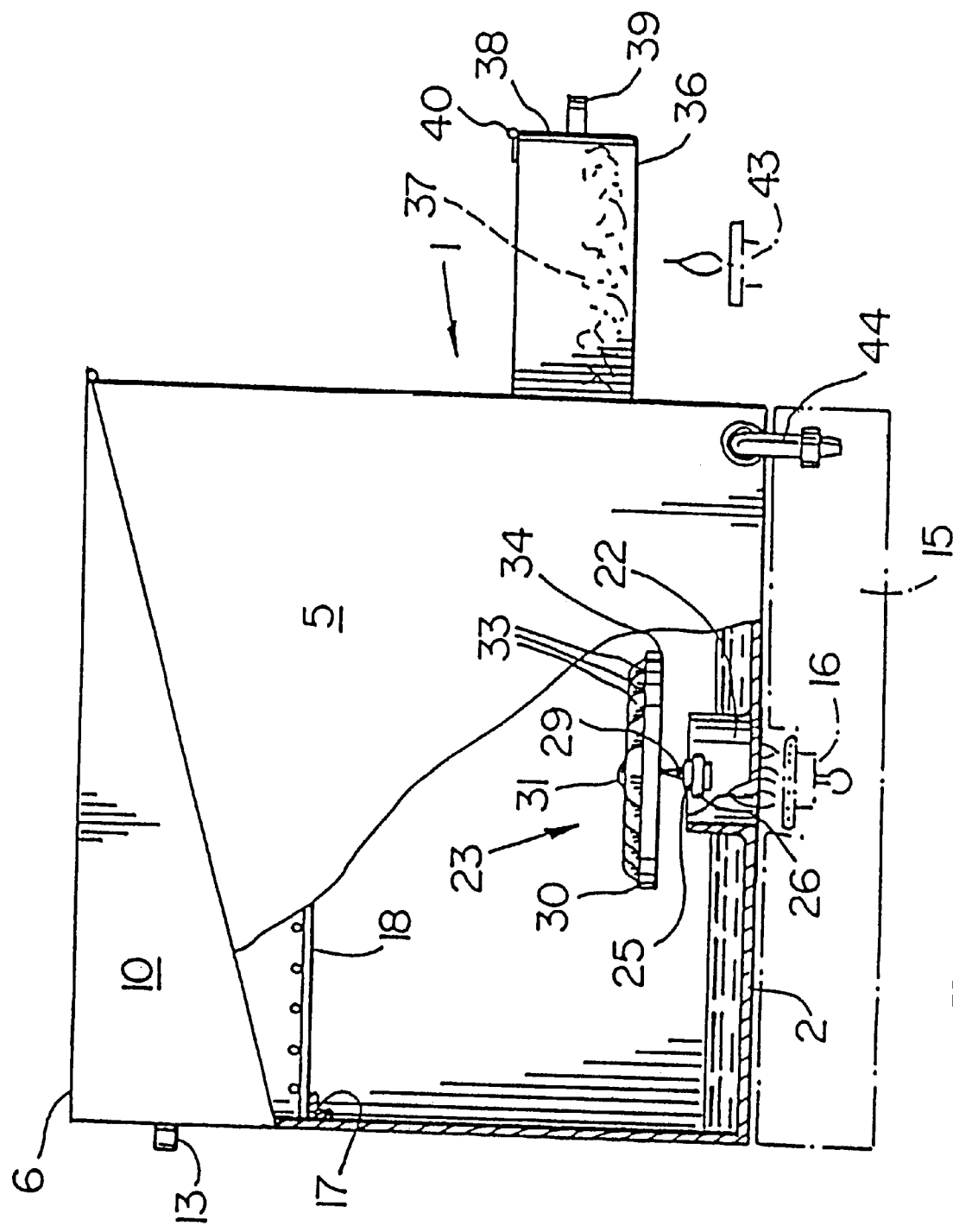
FIG. 5 is a partly sectioned end view of the apparatus of FIGS. 1 and 2.

A tubular tray 36 of rectangular cross section extends outwardly from the rear wall 4 of the housing 1 for receiving wood chips 37 (FIG. 5). A cover 38 with a handle 39 is pivotally mounted on the open outer end of the tray 36 by means of hinges 40. Smoke from the wood chips 37 enters the cooking chamber via an opening 41 (FIG. 3) in the rear wall 4 of the housing 1. The chips 37 are heated by a small separate burner 43.

Before cooking, the housing is mounted on the stove 15 with the sleeves 22 aligned with the burners 16. Water is poured into the housing 1 to a level below the top ends of the sleeves 22. When the burners 16 are started, heat rising through the chimneys defined by the sleeves 22 causes the fans 23 to rotate. As meat on the grill 18 cooks, grease and other liquids escaping therefrom fall into the water in the housing or onto the fans 23. Because the fans 23 are rapidly rotating, the liquids are thrown into the water, and do not fall onto the burners 16. Moreover, the rotating fans serve to distribute heat uniformly throughout the cooking chamber. Hot grease entering the water causes steam to rise in the housing 1 to facilitate the cooking process and preventing drying or burning of the meat. Upon completion of the cooking operation, water can be drained from the housing via a pipe 44. When smoking fish or meat, wood chips 37 are placed in the tray 36, and a burner 43 is placed thereunder. Of course, the apparatus can be used to cook and/or smoke food.

What I claimed is:

1. A cooking apparatus, comprising:

housing means defining a cooking chamber, said housing means including side tall means, bottom wall means and cover means for closing said cooking chamber;

chimney means extending upwardly from said bottom wall means for admitting heat from a heat source to the cooking chamber, whereby water can be placed in said housing means around said chimney means;

fan means for rotatable mounting on said chimney means, whereby, when the housing means is placed over the heat source, rising heat causes said fan means to rotate for deflecting grease and other food produced liquids away from the chimney means and into the water; and the heat source being substantially focused upon the chimney means, thereby avoiding bringing the water disposed within the housing means to a boil.

2. A cooking apparatus according to claim 1, including tubular tray means in said side wall means for receiving wood chips, said tray means being in fluid communication with said cooking chamber, whereby, when the said tray means is heated, smoke from the wood chips enters said cooking chamber.

3. A cooking apparatus according to claim 1, wherein said fan means includes a disc-shaped body means; and spindle means for mounting on said chimney means in the heating chamber rotatable supporting said body means.

4. A cooking apparatus according to claim 3, wherein said fan means includes radially extending, inclined louvres in said body means, whereby the fan is caused to rotate by convection.

5. A cooking apparatus according to claim 3 or 4, wherein said fan means includes crossbar means carrying said spindle means for mounting on the upper end of said chimney means.

6. In combination:

a heat source;

a cooking apparatus, comprising:

housing means defining a cooking chamber, said housing means including side wall means, bottom wall means and cover means for closing said cooking chamber;

chimney means extending upwardly from said bottom wall means for admitting heat from the heat source to the cooking chamber;

water in said housing means around said chimney means;

fan means for rotatable mounting on said chimney means, whereby, when the housing means is placed over the heat source, rising heat causes said fan means to rotate for deflecting grease and other food produced liquids away from the chimney means and into the water; and the heat source being substantially focused upon the chimney means, thereby avoiding bringing the water disposed within the housing to a boil.

7. A method of barbecuing, comprising the steps of:

firstly, providing a cooking apparatus, comprising:

housing means defining a cooking chamber, said housing means including side wall means, bottom wall means and cover means for closing said cooking chamber;

chimney means extending upwardly from said bottom wall means for admitting heat to the cooking chamber;

fan means for rotatable mounting on said chimney means;

secondly, placing water in said housing means around said chimney means; and thirdly, focusing a heat source upon the chimney means with a view to heating the cooking chamber without bringing the water disposed within the housing to a boil, rising heat causing said fan means to rotate for deflecting grease and other food produced liquids away from the chimney means and into the water.

* * * * *